FIP5311 OR AI 124 .D FOR MISSING COPY EXAMINER
no Printed Copy of Specification available
J. HAMILTON.
ORE CRUSHER.
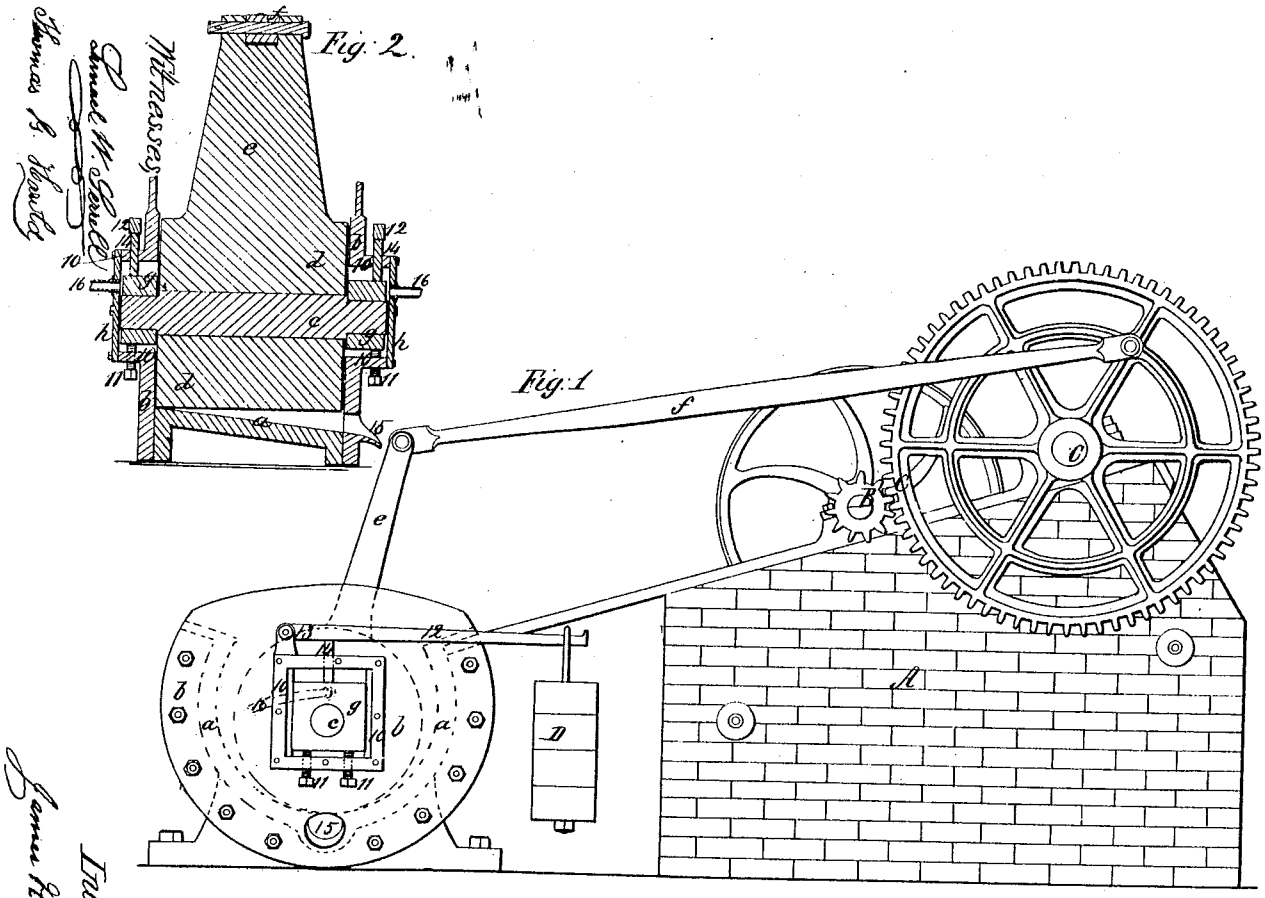
A. I. No. 124. Patented May 22, 1858.